US012753912B1

(12) United States Patent
Li

(10) Patent No.: US 12,753,912 B1
(45) Date of Patent: Oct. 6, 2026

(54) DUAL-STAGE FLASHLIGHT SWITCH AND FLASHLIGHT

(71) Applicant: Wenjie Li, Guangzhou (CN)

(72) Inventor: Wenjie Li, Guangzhou (CN)

( * ) Notice: Subject to any disclaimer, the term of this patent is extended or adjusted under 35 U.S.C. 154(b) by 0 days.

(21) Appl. No.: 19/329,944

(22) Filed: Sep. 16, 2025

(30) Foreign Application Priority Data

Aug. 1, 2025 (CN) ......................... 202521638435.9

(51) Int. Cl.
*F21V 23/04* (2006.01)
*F21L 4/00* (2006.01)
*H01H 13/14* (2006.01)

(52) U.S. Cl.
CPC .......... *F21V 23/0421* (2013.01); *F21L 4/005* (2013.01); *H01H 13/14* (2013.01)

(58) Field of Classification Search
CPC .... F21V 23/0421; F21V 14/005; H01H 13/14
See application file for complete search history.

(56) References Cited

U.S. PATENT DOCUMENTS 6,222,138 B1 * 4/2001 Matthews ................ H01H 3/20 200/321
6,283,609 B1 * 9/2001 Parsons ..................... F21L 2/00 362/205
2006/0034074 A1 2/2006 Ko
2008/0013307 A1 * 1/2008 Kang ...................... F21L 4/085 362/205
2011/0261559 A1 * 10/2011 Couture .................. F21L 4/005 362/208
2019/0203919 A1 7/2019 Fan

FOREIGN PATENT DOCUMENTS

CN 214425948 U 10/2021
DE 19808060 A1 9/1999

OTHER PUBLICATIONS

Extended Search Report issued on Feb. 18, 2026, in corresponding European Application No. 25201512.8, 9 pages.

* cited by examiner

*Primary Examiner* — Zheng Song
(74) *Attorney, Agent, or Firm* — Maier & Maier, PLLC

(57) ABSTRACT

A dual-stage flashlight switch and a dual-stage flashlight are provided. The dual-stage flashlight switch includes a control circuit board, a button, and an electric-conductive component. The electric-conductive component includes a first elastic component, a second elastic component, and a float conducting component. The first elastic component is arranged around and outside the button and abuts against the control circuit board. One end of the second elastic component abuts against an inner wall of a first installation cavity, and another end of the second elastic component abuts against the float conducting component. By providing separate-stage tactile feedback through the first elastic component and the second elastic component, function switching is achieved, so as to solve the problem that the flashlights in the prior art have complex function switching and have a multi-button structure that leads to an increase in volume.

10 Claims, 2 Drawing Sheets

DUAL-STAGE FLASHLIGHT SWITCH AND FLASHLIGHT

CROSS-REFERENCE TO RELATED APPLICATION(S)

The present application claims priority to Chinese Patent Application No. 202521638435.9, filed on Aug. 1, 2025, the content of all of which is incorporated herein by reference.

FIELD

The present disclosure relates to the technical field of outdoor lighting, in particularly to a dual-stage flashlight switch and a dual-stage flashlight.

BACKGROUND

Flashlights have become an indispensable lighting tool during outdoor activities. The turn on/off and function adjustment of the flashlights mainly rely on button operations. When users press a button of the flashlights, the button transmits data to a circuit board, thereby achieving the turn on/off and brightness or mode switching of the flashlights.

At present, the flashlights on the market mainly adopt two button-control designs: one is a single button, and the other is a multi-button combination. The function expandability of a flashlight with the single button is poor, making it difficult to meet users' diverse needs for brightness adjustment, signal flashing, special lighting modes, etc. Although the design of the multi-button combination can achieve more functions, its layout of multiple buttons increases operation complexity, especially in dark environments, where users must repeatedly search one by one to locate a target button. Due to the fact that multi-button structures generally need more arrangement space on a surface of a flashlight, it is necessary to extend a flashlight body of the flashlight to accommodate additional buttons, which not only increases overall volume but also affects portability.

Therefore, the prior art still needs to be improved.

SUMMARY

In view of the above-mentioned defects of the prior art, the present disclosure provides a dual-stage flashlight switch and a dual-stage flashlight to solve the problem that the switch-switching function of the flashlights in the prior art is complex.

Technical solutions of the dual-stage flashlight switch and the dual-stage flashlight both provided by the present disclosure are as follows.

The dual-stage flashlight switch includes:

- a control circuit board, provided with a switch and an electric-conductive member;
- a button, located over the switch, where the button is hollow to form a first installation cavity; and,
- an electric-conductive component, including a first elastic component, a second elastic component, and a float conducting component, where the first elastic component is arranged around and outside the button to support the button, the float conducting component is arranged at the first installation cavity and at least a part of the float conducting component extends outside the first installation cavity, the second elastic component is arranged inside the first installation cavity, one end of the second elastic component abuts against an inner wall of the first installation cavity, and an other end of the second elastic component abuts against the float conducting component.

In some embodiments, the button includes:

- a first press component, where the first press component is hollow to form the first installation cavity, an outer side wall of the first press component extends outwards to form an annular outer edge, and the annular outer edge abuts against the first elastic component; and,
- a second press component, where one end of the second press component is connected to the first press component, and an other end of the second press component is configured to abut against the switch.

In some embodiments, the first installation cavity is an annular cavity, a center position of the first press component is provided with a screw hole, an end part of the second press component connected to the first press component is provided with a thread, and the second press component is inserted into the screw hole and screwed with the first press component.

In some embodiments, an end part of the float conducting component extending outside the annular cavity abuts against the second press component.

In some embodiments, a side of the float conducting component deviating from the float conducting component is inwardly recessed to form a groove, and the second elastic component abuts against the groove.

In some embodiments, the electric-conductive member includes a first electric-conductive pillar and a second electric-conductive pillar, the first electric-conductive pillar and the second electric-conductive pillar are arranged with interval and arranged respectively on two sides of the switch, and the first electric-conductive pillar and the second electric-conductive pillar are both configured to abut against the float conducting component.

In some embodiments, a covering component is arranged on the control circuit board, and the first elastic component abuts against the covering component.

The present disclosure further provides a dual-stage flashlight. The dual-stage flashlight includes a power source, a housing component, a light-source component, and any one of the dual-stage flashlight switches mentioned above.

In some embodiments, the button is movably arranged at an end part of the housing component, the housing component includes an upper housing and a lower housing, the upper housing and the lower housing are connected to form a second installation cavity, and the power source, the control circuit board, and the electric-conductive component are all arranged in the second installation cavity.

In some embodiments, the light-source component is arranged at an end part of the housing component deviating from the button, the light-source component includes a display lamp and a front cover, the display lamp is electrically connected to the power source, and the front cover is sleeved on an end part of the second installation cavity close to the display lamp.

Compared with the prior art, the present disclosure has following beneficial effects.

The present disclosure provides a dual-stage flashlight switch and a dual-stage flashlight. The dual-stage flashlight switch includes the control circuit board, the button, and the electric-conductive component. The electric-conductive component includes the first elastic component, the second elastic component, and the float conducting component. When the button is lightly pressed, the first elastic component is compressed, and the float conducting component contacts and conducts with the electric-conductive member, thereby establishing a circuit. At this time, preset lighting settings can be switched sequentially through cyclic press operations. When the button is pressed heavily, the first elastic component continues to be compressed. At this time, the electric-conductive member pushes the float conducting component to press the second elastic component, and the button contacts the switch, achieving the turn on/off of the switch. By providing separate-stage tactile feedback through the first elastic component and the second elastic component, function switching is achieved, so as to solve the problem that the flashlights in the prior art have complex function switching and have a multi-button structure that leads to an increase in volume.

BRIEF DESCRIPTION OF DRAWINGS

In order to provide a clearer explanation of the technical solutions in the embodiments of the present disclosure or in the prior art, a brief description is given to the accompanying drawings required for describing the present embodiments or the prior art. Obviously, the accompanying drawings are only some embodiments of the present disclosure. For those ordinary skilled in the art, other drawings can be obtained based on the accompanying drawings without any creative efforts.

Attached drawings marks: 100, control circuit board; 110, switch; 120, electric-conductive member; 121, first electric-conductive pillar; 122, second electric-conductive pillar; 130, covering component; 200, button; 210, first installation cavity; 220, first press component; 221, annular outer edge; 222, screw hole; 230, second press component; 231, thread; 310, first elastic component; 320, second elastic component; 330, float conducting component; 400, power source; 500, housing component; 510, upper housing; 520, lower housing; 600, light-source component; 610, display lamp; 620, front cover.

DETAILED DESCRIPTION OF EMBODIMENTS

In order to enable those skilled in the art to better understand the technical solutions of the present disclosure, a clear and complete description of the technical solutions in the embodiments of the present disclosure is provided below in conjunction with the accompanying drawings. Obviously, the described embodiments are only some embodiments of the present disclosure, not all embodiments of the present disclosure. Based on the embodiments in the present disclosure, all other embodiments obtained by those ordinary skilled in the art without creative efforts are within the protection scope of the present disclosure.

The present disclosure is further described in detailed below in conjunction with the accompanying drawings.

In outdoor adventure scenarios, flashlights play a key role as basic lighting equipment. A working principle of the flashlights is that when users press a function button of the flashlights, electrical signals are generated through mechanical contact, and are transmitted to a control circuit board, so that core functions such as turn on/off of lighting, brightness adjustment, and mode switching are completed through a preset program. However, current flashlights on the market have limited designs: the design of single button limits functionality, while the layout of multiple buttons makes operations more complex.

Figure 1:
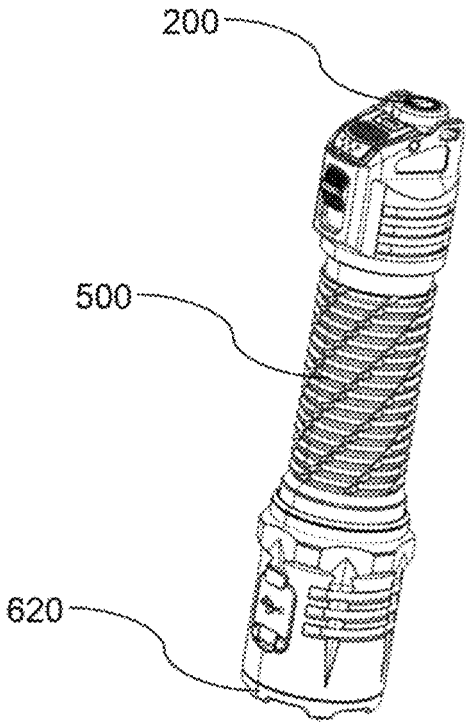
FIG. 1 is a schematic diagram of a main structure of a dual-stage flashlight in the embodiments of the present disclosure.
Figure 2:
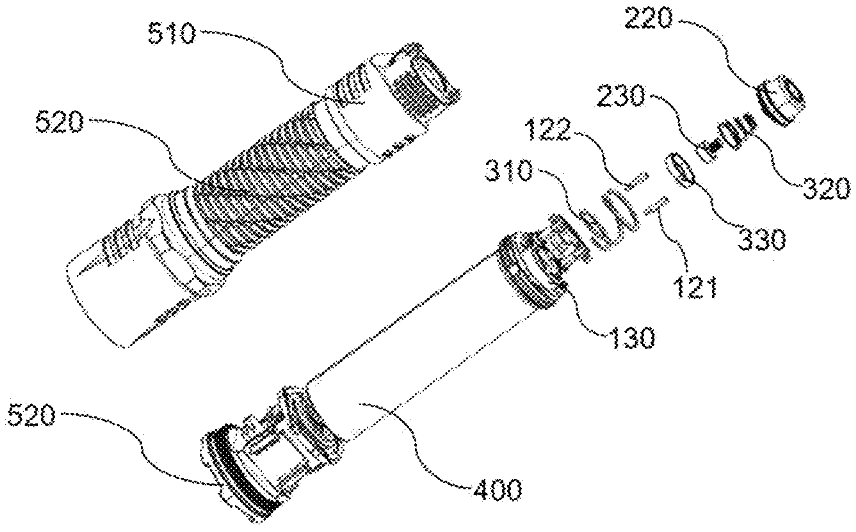
FIG. 2 is an exploded view of the dual-stage flashlight in the embodiments of the present disclosure.

Based on this, an embodiment of the present disclosure discloses a dual-stage flashlight switch and a dual-stage flashlight, as shown in FIG. 1 and FIG. 2. The dual-stage flashlight switch includes a control circuit board 100, a button 200, and an electric-conductive component. The control circuit board 100 is provided with a switch 110 and an electric-conductive member 120. The button 200 is located over the switch 110. The button 200 is hollow to form a first installation cavity 210. The electric-conductive component includes a first elastic component 310, a second elastic component 320, and a float conducting component 330. The first elastic component 310 is arranged around and outside the button 200 to support the button 200. The float conducting component 330 is arranged at the first installation cavity 210 and at least a part of the float conducting component 330 extends outside the first installation cavity 210. The second elastic component 320 is arranged inside the first installation cavity 210. One end of the second elastic component 320 abuts against an inner wall of the first installation cavity 210, and the other end of the second elastic component abuts against the float conducting component 330.

The dual-stage flashlight switch can be applied to flashlights, and function switching can be achieved through separate-stage tactile feedback brought by one button 200. In actual use, the switch 110 and the electric-conductive member 120 are fixedly arranged on the control circuit board 100, while the float conducting component 330 is movably arranged between the electric-conductive member 120 and the button 200. One end of the second elastic component 320 is fixed on an inner wall of the button 200, and the other end of the second elastic component 320 is fixed on the float conducting component 330. The first elastic component 310 is arranged around and outside the button 200 to support the button 200.

Figure 3:
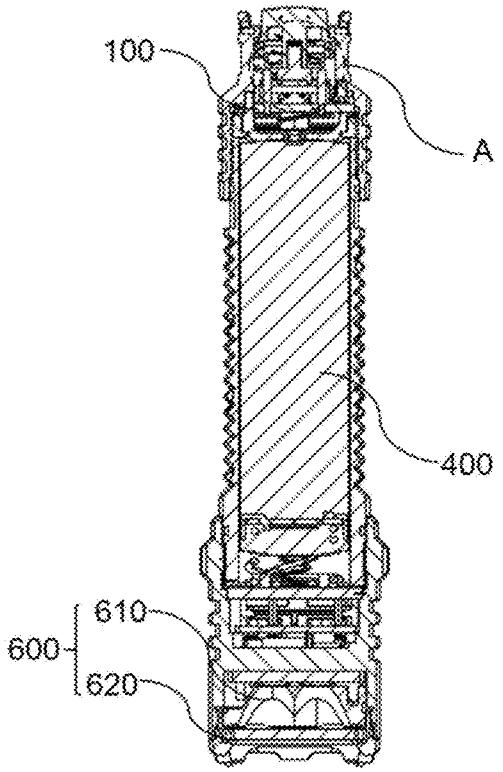
FIG. 3 is a cross-sectional view of the dual-stage flashlight in the embodiments of the present disclosure.
Figure 4:
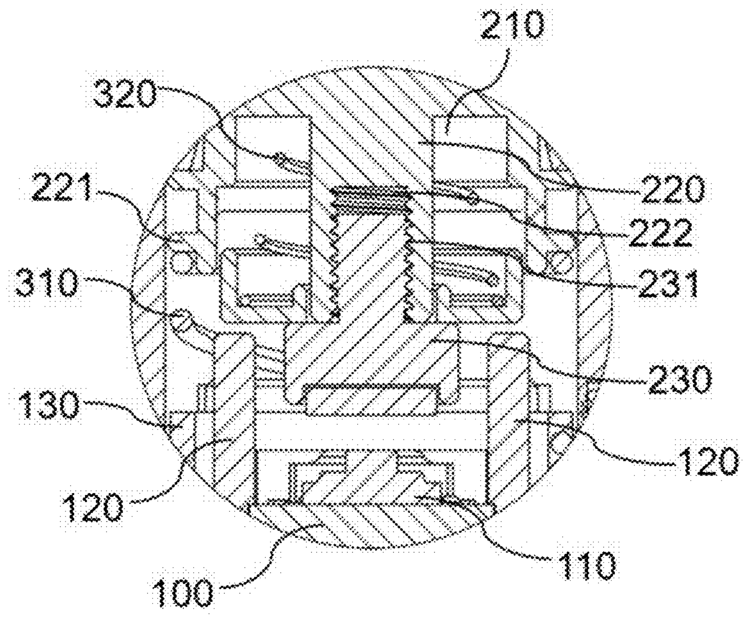
FIG. 4 is an enlarged view of portion A in FIG. 3.

As shown in FIG. 3 and FIG. 4, in a state where the button 200 is not pressed, the first elastic component 310 jacks up the entire button 200. At this time, there is a certain distance between the float conducting component 330 and the electric-conductive member 120, thus the float conducting component 330 and the electric-conductive member 120 are not conductive. In a state of lightly pressing the button 200, the first elastic component 310 is compressed, the button 200 moves downwards, and the float conducting component 330 contacts and conducts with the electric-conductive member 120. At this time, the control circuit board 100 forms a circuit through the electric-conductive member 120 and the float conducting component 330. In a state of heavily pressing the button 200, the first elastic component 310 continues to be compressed and moves downwards (i.e. moves towards the switch 110). At this time, the electric-conductive member 120 abuts against the float conducting component 330, making the float conducting component 330 to move upwards (i.e. move deviating from the switch 110). The float conducting component 330 presses against the second elastic component 320 arranged inside the first installation cavity 210. At the same time, the button 200 descends to a maximum depth and contacts the switch 110 arranged on the control circuit board 100, achieving the turn on/off of the switch 110.

Therefore, the separate-stage tactile feedback is brought by the first elastic component 310, the second elastic component 320, and the float conducting component 330, and different tactile force feedback corresponds to different usage modes and brightness of the flashlight. It can be seen that the embodiment of the present disclosure can achieve the function switching of the flashlight through one button, optimizing processes of the function switching of the flashlight, and at the same time avoiding the button from occupying excessive arrangement space on a surface of the flashlight, thereby making the flashlight smaller and more compact and improving the portability. When a user lightly presses the button 200, the lighting brightness switching or mode switching of the flashlight can be achieved. During this process, the first elastic component 310 is compressed, while the second elastic component 320 remains uncompressed, thus the user only needs to lightly press once to achieve the function switching. When the user heavily presses button 200, the turn on/off of the switch of the flashlight can be achieved. At this time, the first elastic component 310 is compressed, the electric-conductive member 120 abuts against the float conducting component 330, and the electric-conductive member 120 pushes the float conducting component 330 upwards, causing the second elastic component 320 to also be compressed. Thus, the user needs to apply a greater press force to complete this operation.

In the present embodiment, every time the flashlight user lightly presses the button 200, the electrical signals generated by the mechanical contact are transmitted to the control circuit board 100, and the control circuit board 100 adjusts the lighting brightness of the flashlight through the preset program. When the user needs to adjust the lighting brightness of the flashlight or switch the modes of the flashlight, the user can continuously lightly press the button multiple times to achieve functions such as the brightness adjustment or the mode switching through the number of the mechanical contacts.

Before the flashlight leaves a factory, a relationship between the number of times of pressing the button 200 and the preset program of the control circuit board 100 can be preset. The number of times of pressing the button 200 can be 1, 2, 3, 4, or even more. In one implementation, the flashlight has three preset brightness settings. When the button 200 is lightly pressed once, the lighting brightness of the flashlight is at its maximum value (brightest); when the button 200 is lightly pressed twice in a row, the light brightness of the flashlight is at its middle value; when the button 200 is lightly pressed three times in a row, the lighting brightness of the flashlight is at its minimum value (darkest). When the button 200 is heavily pressed, the turn on/off of the switch of the flashlight is achieved.

In one implementation, different electrical signals can also be generated by lightly pressing the button 200 for a certain duration, and the electrical signals are transmitted to the control circuit board 100. The control circuit board 100 can adjust the lighting brightness of the flashlight through the preset program. When the button 200 is lightly and long pressed, the brightness of the flashlight is at its minimum value (darkest); when the button 200 is lightly and short pressed, the brightness of the flashlight is at its maximum value (brightest). When the button 200 is pressed heavily, the button 200 descends to the maximum depth and contacts the switch 110, thereby achieving the turn on/off of the switch of the flashlight.

In the present embodiment, as shown in FIG. 2, the electric-conductive member 120 is set as an electric-conductive pillar, and there are two electric-conductive pillars, i.e. the first electric-conductive pillar 121 and the second electric-conductive pillar 122. The first electric-conductive pillar 121 and the second electric-conductive pillar 122 are arranged respectively at two sides of the switch 110 and arranged with interval. When the button 200 is lightly pressed, the button 200 moves downwards, the first elastic component 310 is compressed, and the float conducting component 330 abuts against the two electric-conductive pillars. The control circuit board 100 forms the circuit through the two electric-conductive pillars and the float conducting component 330.

In another implementation disclosed in the present disclosure, as shown in FIG. 4, the button 200 includes a first press component 220 and a second press component 230. The first press component 220 is hollow to form the first installation cavity 210. An outer side wall of the first press component 220 extends outwards to form an annular outer edge 221. The annular outer edge 221 abuts against the first elastic component 310. One end of the second press component 230 is connected to the first press component 220, and the other end of the second press component 230 is configured to abut against the switch 110.

The first installation cavity 210 is formed inside the first press component 220. A cross-sectional shape of the first press component 220 is a "T" shape, and a cross-sectional shape of the second press component 230 is an inverted "T" shape. The first press component 220 is connected to the second press component 230. A shape of the float conducting component 330 is annular, and the float conducting component 330 is sleeved on a connection position between the first press component 220 and the second press component 230. One side of the float conducting component 330 abuts against the second press component 230.

When the first press component 220 is not under force, the first elastic component 310 supports the first press component 220, so that a certain distance is maintained between the float conducting component 330 and the electric-conductive pillars, and there is no conduction between the float conducting component 330 and the electric-conductive pillars. When the first press component 220 is lightly pressed, the first press component 220 moves downwards, the first elastic component 310 is compressed, and the float conducting component 330 contacts the two electric-conductive pillars. At this time, the control circuit board 100 forms the circuit through the two electric-conductive pillars and the float conducting component 330. When the first press component 220 is heavily pressed, the first press component 220 moves downwards, and the first elastic component 310 continues to be compressed. At this time, the electric-conductive pillars presses against the float conducting component 330, and the float conducting component 330 compresses the second elastic component 320. At this time, the second press component 230 descends to the maximum depth and presses the switch 110 arranged on the control circuit board 100, thereby achieving the turn on/off of the switch of the flashlight.

In the present embodiment, the float conducting component 330 is arranged around and between the first press component 220 and the second press component 230. The second press component 230 provides a certain support force to the float conducting component 330, preventing forming a circuit due to the float conducting component 330 self-descending and coming into contact with the electric-conductive pillars, thereby ensuring circuit safety, and ensuring reliability of a circuit system of the flashlight during operation.

In one implementation, as shown in FIG. 2 and FIG. 4, the first installation cavity 210 is an annular cavity. A center position of the first press component 220 is provided with a screw hole 222. An end part of the second press component 230 connected to the first press component 220 is provided with a thread 231. The second press component 230 is inserted into the screw hole 222 and screwed with the first press component 220. The annular float conducting component 330 is arranged around a connection position between the first press component 220 and the second press component 230. The first press component 220 is screwed with the second press component 230, so that a vertical distance between the second press component 230 and the switch 110 can be adjusted, thereby reducing fault frequency and lowering maintenance costs.

In actual use, an end part of the float conducting component 330 extending outside the annular cavity abuts against the second press component 230. This design ensures that when the first press component 220 is lightly pressed, the float conducting component 330 can come into contact with the electric-conductive pillars. At the same time, when the first press component 220 is heavily pressed, a path of the float conducting component 330 moving upwards and pressing the second elastic component 320 can be extended, so that the user can obtain obvious force feedback. Different force feedback corresponds to different usage modes and brightness of the flashlight, thereby helping the user quickly locate a desired mode and brightness. Through this method, multiple functions can be switched without the need for multiple buttons, thereby reducing complexity of the function switching of the flashlights in the prior art and improving convenience of flashlight usage.

In the present embodiment, as shown in FIG. 4, a covering component 130 is arranged on the control circuit board 100. The covering component 130 is an insulation component. One end of the first elastic component 310 abuts against the annular outer edge 221 of the first press component 220, while the other end of the first elastic component 310 abuts against the covering component 130. This design effectively compresses the first elastic component 310 when lightly or heavily pressing the first press component 220, and isolates the first elastic component 310 from the control circuit board 100 to avoid a short circuit.

In one implementation, a side of the float conducting component 330 deviating from the float conducting component 330 is inwardly recessed to form a groove. One end of the second elastic component 320 abuts against an inner wall of the first press component 220, and the other end of the second elastic component 320 abuts against the groove, ensuring that when the first elastic component 310 is heavily pressed, the float conducting component 330 moves upwards and compresses the second elastic component 320 under the action of the electric-conductive member 120, so that the flashlight user can obtain different force feedback.

Based on the above embodiments, as shown in FIG. 1 and FIG. 2, the present disclosure further discloses a dual-stage flashlight, including a power source 400, a housing component 500, a light-source component 600, and any one of the dual-stage flashlight switches described above. The button 200 is movably arranged at an end part of the housing component 500. The housing component 500 includes an upper housing 510 and a lower housing 520. The upper housing 510 and the lower housing 520 are connected to form a second installation cavity. The power source 400, the control circuit board 100, and the electric-conductive component are all arranged in the second installation cavity.

The power source 400 is arranged in the second installation cavity, and two ends of the power source 400 are respectively connected to the control circuit board 100 and the light-source component 600. At least a part of the button 200 extends outside the second installation cavity, making it easy for users to press, thereby achieving the function switching of the flashlight. When the button 200 is lightly or heavily pressed, the electrical signals generated by the mechanical contact are transmitted to the control circuit board 100 that outputs according to the preset program to adjust the turn on/off or lighting brightness of the light-source component 600.

In addition, in some implementations, the upper housing 510 and the lower housing 520 may be an integrated structure, that is, the upper housing 510 and the lower housing 520 are as a whole to be sleeved at a battery, the control circuit board 100, and the electric-conductive component. Similarly, the upper housing 510 and the lower housing 520 can also be designed as detachable structures, that is, the upper housing 510 and the lower housing 520 are fixedly connected by a connecting piece. For example, the upper housing 510 and the lower housing 520 are screwed together through a screw, or fixedly connected together through a buckle or a clip. Shapes of the upper housing 510 and the lower housing 520 are not limited in the present disclosure and may be a cylindrical or columnar shape, etc. In the present embodiment, the light-source component 600 is arranged at an end part of the housing component 500 deviating from the button 200. The light-source component 600 includes a display lamp 610 and a front cover 620. The display lamp 610 is electrically connected to the power source 400. The front cover 620 is arranged on an end part of the second installation cavity close to the display lamp 610.

In summary, the present disclosure discloses a dual-stage flashlight switch and a dual-stage flashlight, and the dual-stage flashlight switch includes: a control circuit board, a button, and an electric-conductive component. The control circuit board is provided with a switch and an electric-conductive member. The button is located over the switch. The button is hollow to form a first installation cavity. The electric-conductive component includes a first elastic component, a second elastic component, and a float conducting component. The first elastic component is arranged around and outside the button to support the button. The float conducting component is arranged at the first installation cavity and at least a part of the float conducting component extends outside the first installation cavity. The second elastic component is arranged inside the first installation cavity. One end of the second elastic component abuts against an inner wall of the first installation cavity, and the other end of the second elastic component abuts against the float conducting component. When the button is lightly pressed, the first elastic component is compressed, and the float conducting component contacts and conducts with the electric-conductive member, thereby establishing a circuit. At this time, preset lighting settings can be switched sequentially through cyclic press operations. When the button is pressed heavily, the first elastic component continues to be compressed. At this time, the electric-conductive member pushes the float conducting component to press the second elastic component, and the button contacts the switch, achieving the turn on/off of the switch. By providing separate-stage tactile feedback through the first elastic component and the second elastic component, function switching is achieved, so as to solve the problem that the flashlights in the prior art have complex function switching and have a multi-button structure that leads to an increase in volume.

It should be noted that the embodiments or features of the embodiments in the present disclosure can be combined with each other without conflict.

It should be noted that the structures and working principles of the present disclosure are introduced using a dual-stage flashlight switch and a dual-stage flashlight as an example. However, the applications of the present disclosure are not limited to the dual-stage flashlight switch and the dual-stage flashlight, and can further be applied to the production and use of other similar work pieces.

It should be understood that the present disclosure is not limited to the precise structures described above and shown in the accompanying drawings, and various modifications and changes can be made without departing from the scope of the present disclosure. The scope of the present disclosure is limited only by the attached claims.

The above is only some embodiments of the present disclosure and is not intended to limit the present disclosure. Any modifications, equivalent substitutions, improvements, etc. made within the spirits and principles of the present disclosure shall be included in the protection scope of the present disclosure.

What is claimed is:

1. A dual-stage flashlight switch, comprising:

a control circuit board provided with a switch and an electric-conductive member;

a button located over the switch, wherein the button is hollow to form a first installation cavity; and, an electric-conductive component comprising a first elastic component, a second elastic component, and a float conducting component, wherein the first elastic component is arranged around and outside the button to support the button, the float conducting component is arranged at the first installation cavity and at least a part of the float conducting component extends outside the first installation cavity, the second elastic component is arranged inside the first installation cavity, one end of the second elastic component abuts against an inner wall of the first installation cavity, and another end of the second elastic component abuts against the float conducting component.

2. The dual-stage flashlight switch according to claim 1, wherein the button comprises:

a first press component, wherein the first press component is hollow to form the first installation cavity, an outer side wall of the first press component extends outwards to form an annular outer edge, and the annular outer edge abuts against the first elastic component; and, a second press component, wherein one end of the second press component is connected to the first press component, and another end of the second press component is configured to abut against the switch.

3. The dual-stage flashlight switch according to claim 2, wherein the first installation cavity is an annular cavity, a center position of the first press component is provided with a screw hole, an end part of the second press component connected to the first press component is provided with a thread, and the second press component is inserted into the screw hole and screwed with the first press component.

4. The dual-stage flashlight switch according to claim 3, wherein an end part of the float conducting component extending outside the annular cavity abuts against the second press component.

5. The dual-stage flashlight switch according to claim 4, wherein a side of the float conducting component deviating from the float conducting component is inwardly recessed to form a groove, and the second elastic component abuts against the groove.

6. The dual-stage flashlight switch according to claim 1, wherein the electric-conductive member comprises a first electric-conductive pillar and a second electric-conductive pillar, the first electric-conductive pillar and the second electric-conductive pillar are arranged with interval and arranged respectively on two sides of the switch, and the first electric-conductive pillar and the second electric-conductive pillar are both configured to abut against the float conducting component.

7. The dual-stage flashlight switch according to claim 1, wherein a covering component is arranged on the control circuit board, and the first elastic component abuts against the covering component.

8. A dual-stage flashlight, comprising:

a power source, a housing component, a light-source component, and the dual-stage flashlight switch according to claim 1.

9. The dual-stage flashlight according to claim 8, wherein the button is movably arranged at an end part of the housing component, the housing component comprises an upper housing and a lower housing, the upper housing and the lower housing are connected to form a second installation cavity, and the power source, the control circuit board, and the electric-conductive component are all arranged in the second installation cavity.

10. The dual-stage flashlight according to claim 9, wherein the light-source component is arranged at an end part of the housing component deviating from the button, the light-source component comprises a display lamp and a front cover, the display lamp is electrically connected to the power source, and the front cover is sleeved on an end part of the second installation cavity close to the display lamp.

* * * * *